(12) United States Patent
Yang et al.

(10) Patent No.: US 12,105,032 B1
(45) Date of Patent: Oct. 1, 2024

(54) NON-DESTRUCTIVE TESTING METHOD FOR ARTICLE MOISTURE CONTENT BASED ON RADIO FREQUENCY IDENTIFICATION

(71) Applicants: Shandong University, Jinan (CN); Civil Aviation University of China, Tianjin (CN)

(72) Inventors: Yunfan Yang, Jinan (CN); Yang Zhao, Tianjin (CN)

(73) Assignees: Shandong University, Jinan (CN); Civil Aviation University of China, Tianjin (CN)

( * ) Notice: Subject to any disclaimer, the term of this patent is extended or adjusted under 35 U.S.C. 154(b) by 0 days.

(21) Appl. No.: 18/586,626

(22) Filed: Feb. 26, 2024

(51) Int. Cl.
*G01N 22/04* (2006.01)
*H01Q 1/22* (2006.01)

(52) U.S. Cl.
CPC .......... *G01N 22/04* (2013.01); *H01Q 1/2208* (2013.01)

(58) Field of Classification Search
CPC .............................. G01N 22/04; H01Q 1/2208
See application file for complete search history.

(56) References Cited

U.S. PATENT DOCUMENTS

| | | | | |
|---|---|---|---|---|
| 6,622,546 B2 * | 9/2003 | Wu | ....................... | G01N 22/04 324/689 |
| 2003/0115938 A1 * | 6/2003 | Wu | ....................... | G01N 22/04 73/73 |

FOREIGN PATENT DOCUMENTS

WO WO-2010046692 A2 * 4/2010 ............ G01N 29/07

OTHER PUBLICATIONS

Civil Aviation University of China (Applicant), Claims for CN202310392951.7 (allowed), Sep. 28, 2023.
CNIPA, Notification to grant patent right for invention in CN202310392951.7, May 23, 2023.

* cited by examiner

*Primary Examiner* — Jermele M Hollington
*Assistant Examiner* — Taqi R Nasir
(74) *Attorney, Agent, or Firm* — Hemisphere Law, PLLC; Zhigang Ma

(57) ABSTRACT

A non-destructive testing method for article moisture content based on radio frequency identification (RFID) includes: S1, an electronic tag is attached to a surface of an article to be tested, and a signal transceiver is arranged above the electronic tag; S2, the signal transceiver sends a radio-frequency signal to the electronic tag and activates the electronic tag, and the signal transceiver simultaneously receives a backscattered signal from the electronic tag; and S3, the signal transceiver sends the backscattered signal to a signal processor. The method utilizes effects of different moisture content on backscattered signals, arranges the electronic tag on the article to be tested, processes the backscattered signal through the signal processor to obtain a processed signal, and transmits the processed signal to a monitor to display real-time moisture content curve of each article to be tested based on its corresponding serial number.

5 Claims, 1 Drawing Sheet

NON-DESTRUCTIVE TESTING METHOD FOR ARTICLE MOISTURE CONTENT BASED ON RADIO FREQUENCY IDENTIFICATION

TECHNICAL FIELD

The disclosure relates to the field of Internet of Things (IoT) applications, and more specifically to a non-destructive testing method for article moisture content based on radio frequency identification (RFID).

BACKGROUND

With the continuous development of the Internet of Things (IoT) technology, many complex tasks that rely on manual labor can be realized through the IoT technology for intelligent testing with higher efficiency and accuracy. At present, the moisture content testing technology in China is generally divided into two categories, one is destructive moisture content testing, and the other is non-destructive moisture content testing.

The destructive moisture content testing, such as a baking method of limited temperature and time, a dual baking method, etc., has high accuracy and a wide measurement range. However, it is not suitable for applications that require fast online testing due to the long testing time, poor timeliness, and the destruction of the tested article itself. The non-destructive moisture content testing, such as radiographic testing, microwave absorption testing, etc., currently has a fast testing speed and high sensitivity, and non-destruction to the tested article itself. However, it requires complex and expensive instruments, limiting its widespread application.

Both two methods above are not well suited for manual moisture content testing applications due to the disadvantages mentioned above.

SUMMARY

The disclosure provides a non-destructive testing method for article moisture content based on radio frequency identification (RFID), to address the limitations of current manual moisture content testing applications.

To realize the above purpose, the disclosure provides the following technical solution: the non-destructive testing method for article moisture content based on RFID includes: the following steps:

S1, an electronic tag is attached to a surface of an article to be tested, and a signal transceiver is arranged above the electronic tag;

S2, a transmitting antenna of the signal transceiver sends a radio frequency (RF) signal to the electronic tag and activates the electronic tag, and a receiving antenna of the signal transceiver receives a signal backscattered from an internal antenna of the electronic tag in real time;

S3, the signal transceiver sends the received signal to a signal processor, and the signal processor processes the received signal and obtains a real-time signal value;

S4, a phase change value between the real-time signal value obtained in the step S3 and an initial signal value is calculated, and moisture content $Y_{NM}$ of the article to be tested is obtained by substituting the phase change value into a moisture content fitting model formula; the moisture content fitting model formula is:

$$Y_{NM} = \ln^C \sqrt{\frac{\Delta X_{NM} \times B}{A - \Delta X_{NM}}},$$

and A, B and C are constants at a fixed RF signal frequency, and $\Delta X_{NM}$ represents the phase change value; and S5, a moisture content change curve of the article to be tested is constructed according to the moisture content $Y_{NM}$ calculated in the step S4, and a moisture content curve graph of the article to be tested is displayed on a moisture content monitor.

In an embodiment, the signal processor processes the received signal in the step S3, including the following steps S21 and S22.

S21, the signal processor obtains signal values and the serial number of the article to be tested received from the signal transceiver, calculates a signal average value within a predetermined time period, uses a filter to exclude any abnormal data points, and then fills in any missing signal values after removing outliers to maintain consistency of the acquired information changes.

S22, the signal average value obtained in the step S21 is denoised through gaussian filtering for linear smoothing to reduce interference of high-frequency noise.

In an embodiment, a function used in the step S21 for performing the interpolation processing on the missing signal values is: If $|X_s - m_i| > 3\sigma$, $X_s = m_i$, $X_s$ represents an outlier of an input signal, $m_i$ is a median of a window around the outlier, and $\sigma$ is a standard deviation of the window around the outlier.

In an embodiment, a formula for calculating the phase change value $\Delta X_{NM}$ in the step S4 is: $\Delta X_{NM} = X_{NM} - X_{N0}$, $X_{N0}$ represents the initial signal value and $X_{NM}$ represents the real-time signal value.

In an embodiment, the moisture content change curve in the step S5 is fitted with a logistics curve.

The beneficial effects of the disclosure compared to the related art are as follows.

The non-destructive testing method for article moisture content based on RFID provided by the disclosure utilizes effects of different moisture content on backscattered signals, arranges the electronic tag on the article to be tested, processes the backscattered signal through the signal processor to obtain a processed signal, and transmits the processed signal to a monitor to display real-time moisture content curve of each article to be tested based on its corresponding serial number. The method is overall accurate and stable, and can effectively monitor real-time moisture content of the article to be tested, with low cost and high practicality, thus meeting the needs of manual moisture content testing applications.

Compared to current destructive moisture content testing method, the non-destructive testing method provided by the disclosure undoubtedly has a shorter testing time, and at the same time realizes low-power, online and real-time testing to multiple articles, with a wider measurement range, and no damage to the article to be tested.

Compared to current non-destructive moisture content testing, the non-destructive testing method provided by the disclosure is easy to use and understand with low price and high practicality, and suitable for large-scale promotion.

Figure 1:
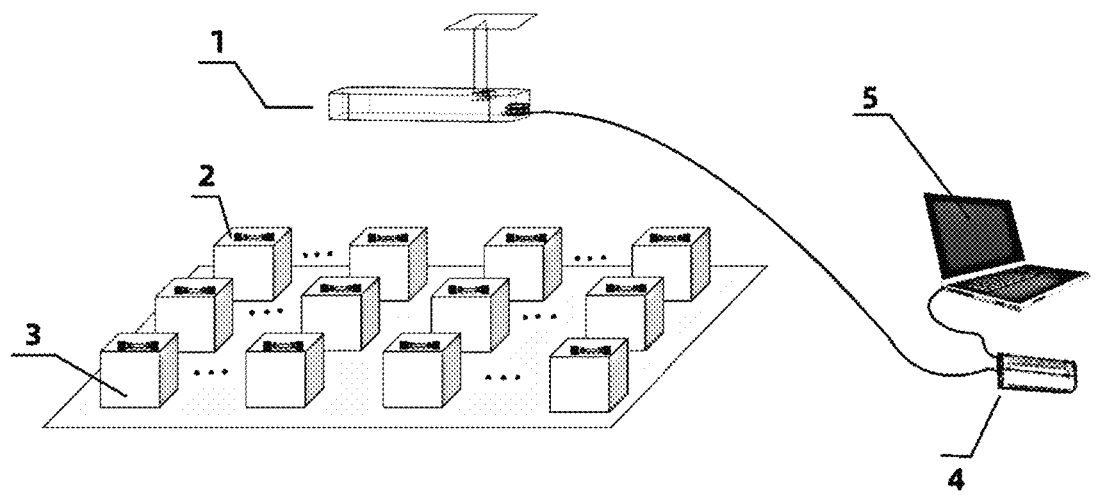
FIG. 1 illustrates a schematic diagram of an overall structure of a non-destructive testing method for article moisture content based on RFID.

Description of reference numerals: 1: signal transceiver; 2: electronic tag; 3: article to be tested; 4: signal processor; 5: moisture content monitor.

DETAILED DESCRIPTION OF EMBODIMENTS

Technical solutions in embodiments of the disclosure are described clearly and completely in the following in conjunction with drawings in the embodiments of the disclosure. It is apparently that the described embodiments are only some of the embodiments of the disclosure, not all of the embodiments. Based on the embodiments of the disclosure, all other embodiments obtained by those skilled in the art without making creative labor are within the scope of protection of the disclosure.

Figure 2:
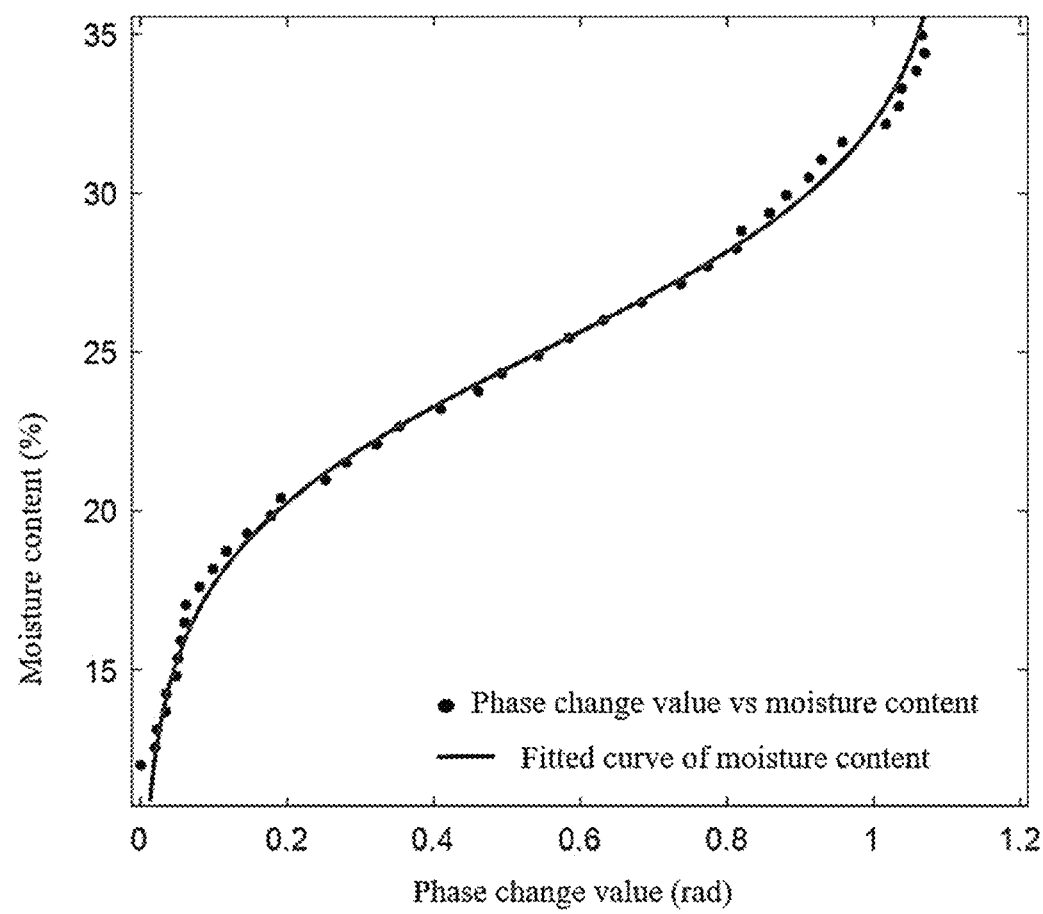
FIG. 2 illustrates a schematic diagram of a fitted curve of phase change values versus moisture content.

Referring to FIG. 1-2, the disclosure provides a technical solution: a non-destructive testing method for article moisture content based on RFID including the following steps S1 to S5.

S1, an electronic tag 2 is attached to a surface of an article 3 to be tested, and a signal transceiver 1 is arranged above the electronic tag 2.

S2, a transmitting antenna of the signal transceiver 1 sends a RF signal to the electronic tag 2 and activates the electronic tag 2, and a receiving antenna of the signal transceiver 1 receives a signal backscattered from an internal antenna of the electronic tag 2 in real time. Due to a theory that moisture content of the article will affect article dielectric constant, the matching relationship between antenna impedance and chip impedance of the electronic tag 2 attached to the surface of the article 3 to be tested changes. Therefore, based on correlation of phase change values and the moisture content, real-time moisture content can be obtained. The theory that the moisture content of the article will affect the article dielectric constant is illustrated in a non-patent literature titled with "Historical development of grain moisture measurement and other food quality sensing through electrical properties" published in the IEEE Instrumentation & Measurement Magazine by S. O. Nelson and S. Trabelsi. Another study shows that changes of ambient moisture content affect RF signal characteristics, and thus the RF signal characteristics can be an indicator for testing the moisture content. The theory that the changes of ambient moisture content affect RF signal characteristics can refer to a non-patent literature titled with "UHF passive RFID-based sensor-less system to detect humidity for irrigation monitoring" published in Microwave and Optical Technology Letters by ALONSO D, ZHANG Q, GAO Y, etc.

S3, the signal transceiver 1 sends the received signal to a signal processor 4, and the signal processor 4 processes the received signal and obtains a real-time signal value.

S4, a phase change value between the real-time signal value obtained in the step S3 and an initial signal value is calculated, and the moisture content $Y_{NM}$ of the article 3 to be tested is obtained by substituting the phase change value into a moisture content fitting model formula. The moisture content fitting model formula is:

$$Y_{NM} = \ln^C \sqrt{\frac{\Delta X_{NM} \times B}{A - \Delta X_{NM}}};$$

A, B and C are constants at a fixed RF signal frequency, and $\Delta X_{NM}$ represents the phase change value.

S5, a moisture content change curve of the article 3 to be tested is constructed according to the moisture content $Y_{NM}$ calculated in the step S4, and a moisture content curve graph of the article 3 to be tested is displayed on a moisture content monitor 5.

In an embodiment, the signal processor 4 processes the received signal in the step S3, including the following steps: S21 and S22.

S21, the signal processor 4 obtains signal values and the serial number of the article 3 to be tested received from the signal transceiver 1, and obtains a signal average value in a preset time. Outliers are eliminated from the signal values by using a Hampel filter with a window size of 7, and the missing signal values are interpolated to ensure consistency of acquired information changes. Specifically, the signal processor 4 obtains the signal values and the serial number of the article 3 to be tested received from the signal transceiver 1, eliminates the outliers from the signal values by using the Hampel filter to obtain the missing signal values, performs interpolation processing on the missing signal values to obtain interpolated signal values, and obtains the signal average value of the interpolated signal values in the preset time.

S22, the processed signal value (e.g., the signal average value) obtained from the step S21 is filtered in real time. Specifically, the signal average value obtained in the step S21 is denoised through gaussian filtering for linear smoothing to reduce interference of high-frequency noise.

In an embodiment, a function used in the step S21 for performing the interpolation processing on the missing signal values is: If $|X_s - m_i| > 3\sigma$, $X_s = m_i$. $X_s$ represents an outlier of an input signal, and $m_i$ is a median of a window around the outlier. Signal values of the windows are sorted in order of size. When the number of the windows is odd, a middlemost signal value is selected as the median of the window around the outlier, and when the number of the windows is even, an average value of middlemost two signal values is selected as the median of the window around the outlier. $\sigma$ is a standard deviation of the window around the outlier. The meaning of the function is that when an absolute value of the difference between the outlier of the input signal $X_s$ and the median of the window around the outlier $m_i$ is greater than 3 times the standard deviation $\sigma$, then the median $m_i$ of the window around the outlier is used to interpolate the missing signal value after the outlier elimination, and the standard deviation of the window around the outlier is 0.02.

In an embodiment, a formula for calculating the phase change value $X_{NM}$ in the step S4 is: $\Delta X_{NM} = X_{NM} - X_{N0}$. $X_{N0}$ represents the initial signal value and $X_{NM}$ represents the real-time signal value.

In an embodiment, the moisture content change curve in the step S5 is fitted with a logistics curve.

To verify the effectiveness of the disclosure, a moisture content testing experiment is conducted using dried bedding of corn cob at a room temperature of 25° C. The disclosure is described in further detail in conjunction with drawings and embodiments:

S1, passive RFID tags are taken as the electronic tags 2. The electronic tags 2 are attached vertically to surfaces of respective outer packaging bags of the corn cob by a staff member or is added to the surfaces of the respective outer packaging bags of the corn cob by a producer in a production process of the outer packaging bag. And a RF reader is arranged as the signal transceiver 1 above the corn cob to be tested.

S2, the signal transceiver 1 transmits signals to the electronic tags 2, and due to a change in moisture content of the corn cob, signal values backscattered of the electronic tags 2 are biased and change regularly with the continued change in the moisture content.

S3, the signal processer 4 processes the signals received from the signal transceiver 1 for the first time, solving problem of the signal value jumping, and interpolate the outliers to ensure the consistency of the acquired information changes. And the signal processer 4 obtains the signal average value, and classify the signals of the different electronic tags 2. $X_{N0}$ is recorded as the initial signal value of the N-th electronic tag 2.

S4: the signal transceiver 1 receives the signals backscattered from the electronic tags 2 at every interval. With the change of the moisture content, the received signal values change in real time. The real-time signal values are processed, and $X_{NM}$ is recorded as the real-time signal value of the N-th electronic tag 2. The phase change value $\Delta X_{NM}$ is calculated according to the formula $\Delta X_{NM} = X_{NM} - X_{N0}$. And specific phase change values are shown in Table 1 below:

TABLE 1

| Observation Times (times) | Phase change value $\Delta X_{NM}$ (rad) |
|---|---|
| 1 | 0.065 |
| 2 | 0.079 |
| 3 | 0.096 |
| 4 | 0.1147 |
| 5 | 0.194 |
| 6 | 0.356 |
| 7 | 0.456 |
| 8 | 0.743 |
| 9 | 0.815 |
| 10 | 0.87 |
| 11 | 0.91 |

S5, the phase change value $\Delta X_{NM}$ is substituted into the formula to obtain estimated moisture content $$Y_{NM} : Y_{NM} = \ln^C \sqrt{\frac{\Delta X_{NM} \times B}{A - \Delta X_{NM}}};$$

A is 1.108, B is 71.15 and C is 0.3122. A relative error of moisture content δ is calculated by a formula below by comparing the estimated moisture content $Y_{NM}$ with real moisture content $\mu_{NM}$. When all the relative errors are less than 5%, as shown in following Table 2, goodness of the model fitted to the calculation of moisture content is 0.99, which indicates that accuracy of the model is as high as 99%.

The formula to calculate the relative error δ is $$\delta = \frac{Y_{NM} - \mu_{NM}}{\mu_{NM}};$$

δ represents the relative error of the moisture content, $Y_{NM}$ represents the estimated moisture content, and $\mu_{NM}$ represents the real moisture content.

TABLE 2

| Observation Times (times) | Estimated moisture content $Y_{NM}$ (%) | real moisture content $\mu_{NM}$ (%) | relative error δ |
|---|---|---|---|
| 1 | 5.6 | 5.6 | 0.00% |
| 2 | 6.17 | 6.16 | 0.16% |
| 3 | 6.73 | 6.72 | 0.15% |
| 4 | 7.28 | 7.28 | 0.00% |
| 5 | 8.96 | 8.96 | 0.00% |
| 6 | 11.22 | 11.21 | 0.07% |
| 7 | 12.34 | 12.33 | 0.08% |
| 8 | 15.69 | 15.69 | 0.00% |
| 9 | 16.83 | 16.81 | 0.12% |
| 10 | 17.93 | 17.93 | 0.00% |
| 11 | 19.05 | 19.05 | 0.02% |

Compared to current destructive moisture content testing method, the method above undoubtedly has a shorter testing time, and at the same time realizes low-power, online and real-time testing to multiple articles, with a wider measurement range, and no damage to the article 3 to be tested.

Compared to current non-destructive moisture content testing, the method above is easy to use and understand with low price and high practicality, and suitable for large-scale promotion.

It is noted that, in this context describing the disclosure, relational terms such as first and second are used only to distinguish one entity or operation from another, and not necessarily to require or imply any such actual relationship or order between those entities or operations. Furthermore, the terms "including", "comprising", or any other variant thereof, are intended to cover non-exclusive inclusion, therefore, that a process, method, article or apparatus including a set of elements includes not only those elements, but also other elements that are not expressly listed or that are inherent to the process, method, article or equipment.

Although the embodiments of the disclosure have been shown and described, those skilled in the art should understand that a variety of changes, modifications, substitutions, and variations may be made to these embodiments without departing from the principle and spirit of the disclosure. The scope of the disclosure is limited by the appended claims and their equivalents.

What is claimed is:

1. A non-destructive testing method for article moisture content based on radio frequency identification (RFID), comprising the following steps:
   S1, attaching an electronic tag to a surface of an article to be tested, and arranging a signal transceiver above the electronic tag;
   S2, sending, by a transmitting antenna of the signal transceiver, a radio frequency (RF) signal to the electronic tag and activating the electronic tag, and simultaneously receiving a signal backscattered from an internal antenna of the electronic tag by a receiving antenna of the signal transceiver;
   S3, sending the received signal to a signal processor by the signal transceiver, and processing the received signal and obtaining a real-time signal value by the signal processor;
   S4, calculating a phase change value between the real-time signal value obtained in the step S3 and an initial signal value, and obtaining moisture content $Y_{NM}$ of the article to be tested by substituting the phase change value into a moisture content fitting model formula; wherein the moisture content fitting model formula is:

$$Y_{NM} = \ln^C \sqrt{\frac{\Delta X_{NM} \times B}{A - \Delta X_{NM}}} \ ;$$

wherein A, B and C are constants at a fixed RF signal frequency, and $\Delta X_{NM}$ represents the phase change value; and S5, constructing a moisture content change curve of the article to be tested according to the moisture content $Y_{NM}$ calculated in the step S4, and displaying a moisture content curve graph of the article to be tested on a moisture content monitor.

2. The non-destructive testing method for article moisture content based on RFID as claimed in claim 1, wherein processing the received signal by the signal processor in the step S3, comprises the following steps:

S21, obtaining, by the signal processor, signal values and a serial number of the article to be tested received from the signal transceiver, calculating a signal average value within a predetermined time period, using a filter to exclude any abnormal data points, and then filling in any missing signal values after removing outliers to maintain consistency of acquired information changes; and S22, denoising the signal average value obtained in the step S21 through gaussian filtering for linear smoothing to reduce interference of high-frequency noise.

3. The non-destructive testing method for article moisture content based on RFID as claimed in claim 2, wherein a function used in the step S21 for performing the interpolation processing on the missing signal values is: If $|X_s - m_i| > 3\sigma$, $X_s = m_i$, wherein $X_s$ represents an outlier of an input signal, $m_i$ is a median of a window around the outlier, and $\sigma$ is a standard deviation of the window around the outlier.

4. The non-destructive testing method for article moisture content based on RFID as claimed in claim 1, wherein a formula for calculating the phase change value $\Delta X_{NM}$ in the step S4 is: $\Delta X_{NM} = X_{NM} - X_{N0}$, wherein $X_{N0}$ represents the initial signal value and $X_{NM}$ represents the real-time signal value.

5. The non-destructive testing method for article moisture content based on RFID as claimed in claim 1, wherein the moisture content change curve in the step S5 is fitted with a logistics curve.

* * * * *